(12) United States Patent
McLennan et al.

(10) Patent No.: US 8,595,187 B1
(45) Date of Patent: Nov. 26, 2013

(54) SERIALIZATION FOR DELTA ENCODING

(71) Applicant: Ilesfay Technology Group, LLC, Cincinnati, OH (US)

(72) Inventors: Christopher S. McLennan, Cincinnati, OH (US); Joseph T. Kramer, Taylor Mill, KY (US); James P. Taylor, Cincinnati, OH (US); Mike Venerable, Mason, OH (US)

(73) Assignee: Ilesfay Technology Group, LLC, Cincinnati, OH (US)

( * ) Notice: Subject to any disclaimer, the term of this patent is extended or adjusted under 35 U.S.C. 154(b) by 0 days.

(21) Appl. No.: 13/935,809

(22) Filed: Jul. 5, 2013

Related U.S. Application Data

(60) Provisional application No. 61/764,225, filed on Feb. 13, 2013.

(51) Int. Cl.
*G06F 7/00* (2006.01)
*G06F 17/40* (2006.01)

(52) U.S. Cl.
USPC ........... 707/638; 707/687; 707/690; 707/695; 707/999.203

(58) Field of Classification Search
None
See application file for complete search history.

(56) References Cited

U.S. PATENT DOCUMENTS

| | | | | |
|---|---|---|---|---|
| 5,293,600 | A | * | 3/1994 | Vriezen ........................ 711/152 |
| 5,878,414 | A | * | 3/1999 | Hsiao et al. ................... 707/648 |
| 2005/0256895 | A1 | * | 11/2005 | Dussault ....................... 707/102 |
| 2010/0293142 | A1 | * | 11/2010 | Ackerman et al. ............ 707/640 |

* cited by examiner

*Primary Examiner* — Sangwoo Ahn
(74) *Attorney, Agent, or Firm* — Frost Brown Todd LLC

(57) ABSTRACT

Data can be serialized in such a manner as to facilitate later delta encoding, even when the serialization is performed using a lossy compression algorithm or an algorithm in which portions of the serialized data are encoded relative to other portions which may be modified. This can be achieved by approaches including preserving keyframe information across modified versions of a file, duplicating information from a previously created compressed file when serializing a later version, or adding change information showing differences between versions of a file during the serialization process.

15 Claims, 10 Drawing Sheets

```
<svg xmlns="http://www.w3.org/2000/svg" version="1.1">

<rect
        id="rect1"
        x="150"
        y="150"
        width="300"
        height="100"
        style="fill:rgb(0,0,255);stroke-width:1;stroke:rgb(0,0,0)"
    />

<circle
        id="circle1"
        cx="100"
        cy="50"
        r="40"
        stroke="black"
        stroke-width="2"
        fill="red"
    />

<polygon
        id="polygon1"
        points="200,10 250,190 160,210"
        style="fill:lime;stroke:purple;stroke-width:1"
    />

</svg>
```

Figure 6a

```
<svg xmlns="http://www.w3.org/2000/svg" version="1.1">
    <rect
        id="rect1"
        x="150"
        y="150"
        width="300"
        height="100"
        style="fill:rgb(0,0,255);stroke-width:1;stroke:rgb(0,0,0)"
    />

<circle
        id="circle1"
        cx="150"
        cy="50"
        r="40"
        stroke="black"
        stroke-width="2"
        fill="red"
    />

<polygon
        id="polygon1"
        points="200,10 250,190 160,210"
        style="fill:lime;stroke:purple;stroke-width:1"
    />
</svg>
<deltainfo baseDocumentID="0">

<elementDelta
        elementId="circle1"
        attributeName="cx"
        attributeDelta="50"
    />
</deltainfo>
```

Figure 6b

```
<svg xmlns="http://www.w3.org/2000/svg" version="1.1">
  ↑
  604
    <rect
        id="rect1"
        x="150"
        y="100"
        width="300"
        height="100"
        style="fill:rgb(0,0,255);stroke-width:1;stroke:rgb(0,0,0)"
    />

<circle
        id="circle1"
        cx="150"
        cy="50"
        r="40"
        stroke="black"
        stroke-width="2"
        fill="red"
    />

<polygon
        id="polygon1"
        points="200,10 250,190 160,210"
        style="fill:lime;stroke:purple;stroke-width:1"
    />
      605
       ↓        601            606
</svg>          ╱              ╱
<deltainfo baseDocumentID="0">

<elementDelta
        elementId="rect1"     ⎫
        attributeName="y"     ⎬ 603
        attributeDelta="-50"  ⎭
    />
       602
        ↓
</deltainfo>
```

Figure 6c

SERIALIZATION FOR DELTA ENCODING

CROSS REFERENCE TO RELATED APPLICATIONS

This is a non-provisional of, and claims priority from, U.S. provisional patent application 61/764,225, filed on Feb. 13, 2013 with the same inventors as the present document. The disclosure of U.S. provisional patent application 61/764,225 is hereby incorporated by reference in its entirety.

FIELD

The technology disclosed herein can be applied to the serialization of data. In certain preferred embodiments of the disclosed technology, this serialization can facilitate delta encoding by preserving keyframe or other information between versions of serialized data.

BACKGROUND

As described in U.S. Pat. No. 8,244,831 ("Method for the preemptive creation of binary delta information within a computer network" to McLennan et al, the disclosure of which is hereby incorporated by reference in its entirety), it can be useful to apply delta encoding to identify commonalities between files. However, for some file formats, even two files which appear identical to an end user can be made up of very different data. For example, if a first Mp3 file is created by serializing an unedited version of a song, an edited version of the song is created by censoring an obscenity in the song's introduction, and a second Mp3 file is created by serializing the edited version of the song, the first and second Mp3 files may be radically different. This type of difference can complicate and/or reduce the benefits of delta encoding. Similarly, many file formats, such as WORD (DOC) and standard ACIS binary (SAB), are designed to optimize the efficiency with which the file can be stored on a disk, or can be read from a disk into a computer's memory. These types of optimization can also complicate and/or reduce the benefits of delta encoding. Accordingly, there is a need in the art for technology in which serialization is, or can be, performed in a manner which facilitates subsequent delta encoding of the serialized data.

SUMMARY

Disclosed herein are techniques which can be used in a variety of settings, including the serialization of data into compressed formats such as Mp3, Ogg, H264, DOC, SAB, DXF, and MP4, in a manner which will facilitate later transfer (e.g., by delta encoding) of the serialized data. For example, the disclosure set forth herein could be used to implement a machine which maintains keyframes between serialized versions of a master media file even as modifications are made to that master media file. The disclosure set forth herein an also be used to generate data which could be used for delta encoding at the time of serialization.

Of course, other machines, as well as methods and articles of manufacture could also be implemented based on the disclosure set forth herein. Accordingly, the summary set forth above should be understood as illustrative only of how some aspects of the inventors' technology could be implemented, and should not be treated as limiting on the protection accorded by this document, or by any related document.

BRIEF DESCRIPTION OF THE DRAWINGS

The drawings and detailed description which follow are intended to be merely illustrative and are not intended to limit the scope of the invention as contemplated by the inventors.

FIGS. 6a-6c illustrate how an image can be represented using the SVG format, and further illustrate how information showing changes from a base document can be included in a file storing a modified version of the image.

DETAILED DESCRIPTION

Figure 1:
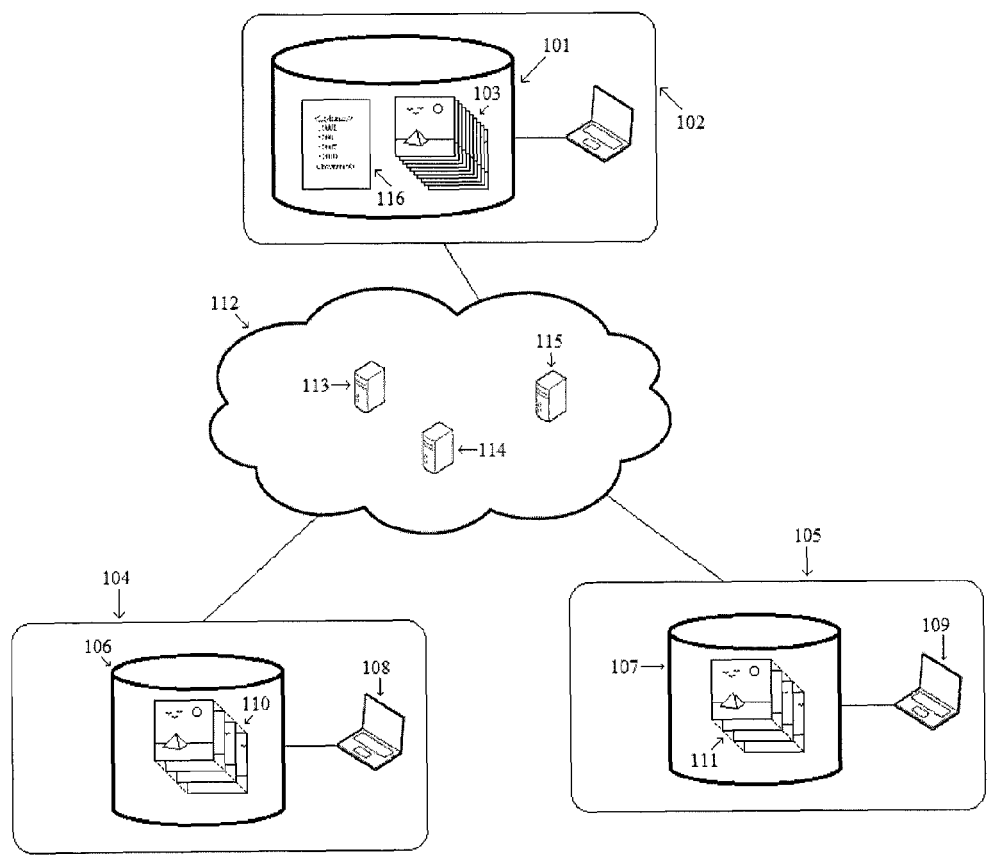
FIG. 1 illustrates an environment in which the technology described herein could be beneficially employed.

Turning now to the figures, FIG. 1 illustrates an environment in which the technology described herein could be beneficially employed. In that figure, a master database [101] at a central location [102] contains a master media file [103]. FIG. 1 also illustrates a plurality of remote locations [104] [105], each of which has a remote database [106][107], and a remote computer [108][109] which is connected to, and can be used to consume content in, one of the remote databases [106][107]. The remote locations [104][105] and the central locations [102] are connected via a cloud based transfer service [112] which could be used to transfer data between the central location [102] and the remote locations [104][105] using one or more servers [113][114][115] such as described in U.S. Pat. No. 8,244,831.

To illustrate how the technology disclosed here could be used in an environment such as shown in FIG. 1, consider a scenario in which the master media file [103] is a movie made up of 150,000 frames, each of which is encoded as a 1280× 720 pixel bitmap image, and the remote databases [106][107] contain copies [110][111] of a compressed version of the master media file [103] comprising bitmaps for every 15$^{th}$ frame of the master media file [103] (i.e., frames 0, 15, 30, 45, etc of the compressed version and the master media file [103] are identical), and data describing how the remaining frames can be derived from the bitmaps. For example, in the compressed version, frames 1-14 could include only the pixels which are different from frame 0, frames 16-29 could include only the pixels which are different from frame 15, etc, thereby avoiding the need for the compressed version to include the full 1280×720 pixels for each of the master media file's 150,000 frames.

In such a scenario, a change to the master media file [103] which impacts the frames which are encoded as bitmaps in both the master media file [103] and the copies of the compressed version [110][111] could result in the compressed version of the new modified master media file being very different from the compressed version of the original master media file. For example, if a new frame is added between frames 10 and 11 of the original master media file, the result would be that every frame in the compressed version of the revised master media file from frame 15 on would be different from the compressed version of the original master media file. To avoid this result, information about which frames from the original master media file had been stored as bitmaps in both the original master media file and the compressed version of the original master media file could be maintained in a configuration file [116]. Such a configuration file could then be used in a process such as shown in FIG. 2 to maximize the similarity with the compressed version of the original master media file when creating a compressed version of a revised master media file, rather than simply encoding every 15th frame as a bitmap in the compressed version of the revised master media file.

Figure 2:
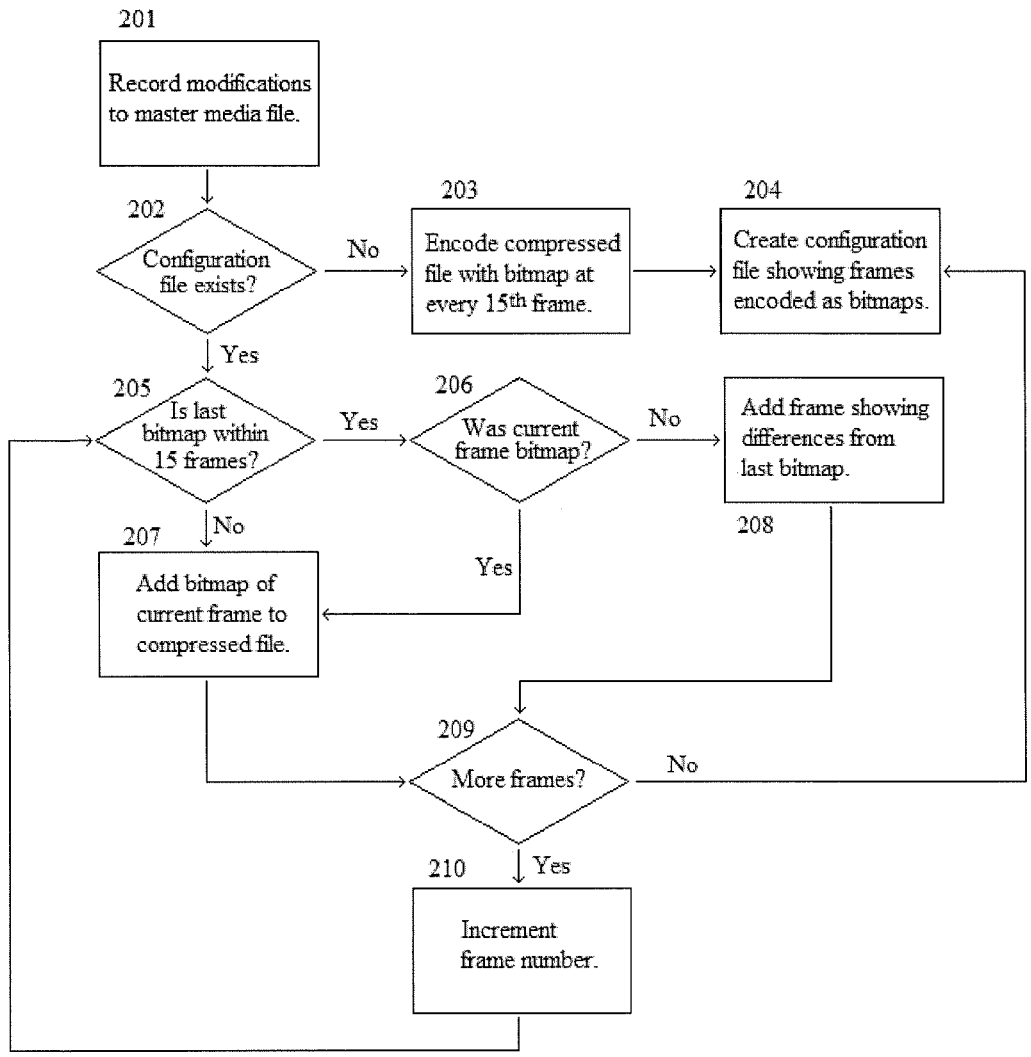
FIG. 2 illustrates a process for serializing a revised version of a file in which configuration data can be used to increase the similarity to a similarity to a compressed version of an unrevised version of the file.

The process of FIG. 2 begins during the modification of the master media file, with a step of recording modifications to the master media file [201] as they are taking place. This recording of modifications could be performed in a number of manners. For example, data could be stored in the memory of the computer used to modify the master media file stating information such as which frames in the master media file had been moved to new locations, which frames in the master media file had been edited (e.g., modification of pixels, in the case of frames represented as bitmaps), which frames in the master media file had been deleted, and what new frames had been added to the master media file. Similarly, data could be stored showing, for each frame in the revised master media file, if that frame was identical to a frame in the original master media file and, if an identical frame existed in the original master media file, which frame was identical. Alternatively, it is also possible that the specific changes made (e.g., which pixels in particular bitmaps were altered) could be recorded.

Of course, as will be appreciated by those of ordinary skill in the art, a step of recording modifications to a master media file may not be performed as those modifications are being made. For example, it is also possible that a copy of the unmodified master media file would be maintained, and that modifications to the master media file could be identified after the modifications were complete by comparing the modified and original versions of the master media file. This could be beneficially employed, for example, in cases where two uncompressed versions of a master media file are available, and an organization wishes to create a new compressed file from one of the already existing versions of the master media file. Further variations, such as combinations of those described above, are also possible, and will be immediately apparent to those of ordinary skill in the art in light of this disclosure.

Once it was time to create a compressed version of the master media file, the process of FIG. 2 would continue by checking [202] whether a configuration file exists for the media file which was modified. If no such configuration file exists, then a compressed version of the master media file is created with a bitmap at every 15th frame [203], and a configuration file showing which frames from the master media file are encoded as bitmaps in the compressed file is created [204].

Alternatively, if a configuration file does exist, the process of FIG. 2 continues by checking [205] if the last bitmap added to the compressed version of the media file is within 15 frames of the current frame. If the last bitmap added to the compressed file was within 15 frames of the current frame, another check [206] is performed to see whether the configuration file says that the current frame was encoded as a bitmap in a compressed version of the media file which was created before the modification was made. If it was, or if the last bitmap was not within 15 frames, then a bitmap for the current frame is added to the compressed version of the media file [207]. Otherwise, a frame showing only the differences between the current frame and the last bitmap is added to the compressed file [208].

Finally, once the frame has been added to the compressed file (either as a bitmap [207] or a set of differences from the last bitmap [208]), a check [209] is made of whether there are any further frames in the media file to be added to the compressed file. If there are, then the process moves to the next frame [210] and returns to check [205] if the last bitmap added to the compressed version of the media file was within 15 frames of the current frame. Otherwise, the process concludes with the creation [204] of a configuration file showing which frame were encoded as bitmaps in the compressed version of the master media file.

It should be understood that the process shown in FIG. 2 is intended to be illustrative only, and that the technology disclosed herein could be implemented in other manners than depicted in FIG. 2. For example, in the process of FIG. 2, a configuration file showing which frames in the compressed version of the master media file are encoded as bitmaps is created [204] after the creation of the compressed version of the master media file is complete. However, this type of information could be captured at other times as well. For example, while the compressed version of the master media file is being created, every time a frame encoded as a bitmap is added to that file, the configuration file can be updated to include an indication of the frame which was added as a bitmap. Alternatively, a configuration file could be created, not when a new compressed version of the master media file is created, but when the compressed version of the master media file is distributed to one or more remote locations [104][105], or to a repository (e.g., committed the database [101], or uploaded to a cloud based transfer service [112], or saved to some other remote database (not shown in FIG. 1)).

Other variations on the process of FIG. 2 are also possible. For example, rather than using a separate configuration file to store information on what data is encoded as bitmaps in the compressed file, such information could be encoded as metadata in either the master media file, the compressed file, or both. An illustration of a format which could be used for this is set forth below in table 1.

TABLE 1

Illustrative format for encoding information in metadata.

```
<file>
    <frame encoded_as_bitmap = TRUE>
    </frame>
    <frame encoded_as_bitmap = FALSE>
    </frame>
    <frame encoded_as_bitmap = FALSE>
    </frame>
    . . .
    <frame encoded_as_bitmap = TRUE>
    </frame>
    <frame encoded_as_bitmap = FALSE>
    </frame>
</file>
```

Other formats are also possible. For example, rather than explicitly indicating whether each frame is encoded as a bitmap in the compressed version of the file, in some implementations, there would only be explicit references to whether a frame was encoded as a bitmap in a compressed version of a file when that frame was, in fact, encoded as a bitmap in the compressed version. Alternatively, in some cases, metadata could include more information than shown in table 1. For example, there could be information showing which compressed files include a frame encoded as a bitmap, rather than simply encoding that a compressed file includes a frame encoded as a bitmap (e.g., "encoded_as_bitmap=[filename string]", rather than "encoded_as_bitmap=[TRUE/FALSE bool]"). Approaches which do not rely on any explicit record of how information is encoded in a compressed file are also possible. For example, it is possible that information on which frames in a compressed file are encoded as bitmaps could be determined by examining a copy of the compressed file itself (e.g., frames encoded as bitmaps will have a specific and predictable size, while frames encoded as differences from the most recent bitmaps will generally be smaller and will have differing sizes based on their content). Combinations of these approaches (e.g., using metadata to showing which compressed files include a particular frame encoded as a bitmap, but only doing so explicitly when at least one compressed file does so) are also possible, and could be implemented by those of ordinary skill without undue experimentation in light of this disclosure.

Another type of variation which could be used to implement the inventors' technology is to combine steps described above as being separate. For example, in the process of FIG. 2, an initial check [202] is made of whether a configuration file exists and, depending on whether the file exists, a compressed version of the media file is created with bitmaps at every 15$^{th}$ frame [203], or a separate encoding sequence is entered in which frames are added to the compressed version of the media file as bitmaps if they are more than 15 frames away from the previous bitmap, or if the configuration file indicates that they were encoded as bitmaps in a previously created compressed file [205]-[210].

Figure 3:
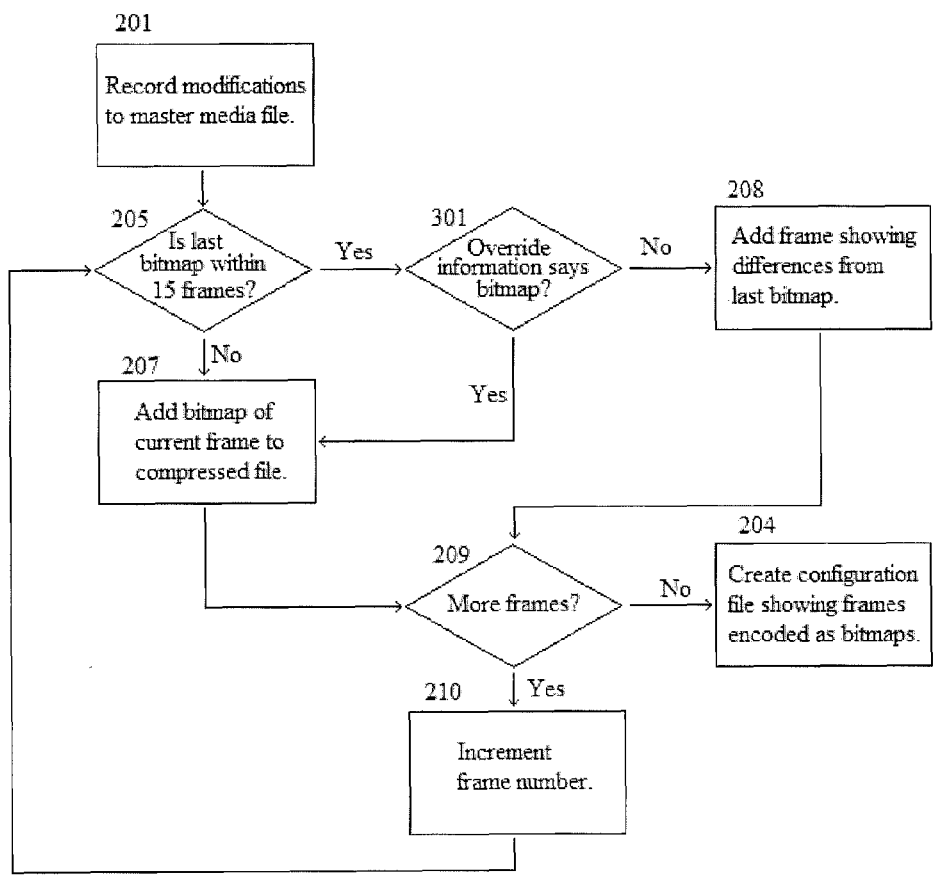
FIG. 3 illustrates a process for serializing a revised version of a file in which configuration data can be used to increase the similarity to a similarity to a compressed version of an unrevised version of the file.

It is also possible that a similar approach could be used which combined the separate encoding sequences and removed the preliminary check for the configuration file. A flowchart showing how such an alternative sequence could be performed is provided in FIG. 3. In that figure, instead of multiple encoding sequences, there is only a single encoding sequence in which a check [301] is performed to determine whether there is override information (e.g., as might be stored in a configuration file or metadata as described previously, or in other manners as described below) which indicates that the current frame should be added to the compressed file as a bitmap even though the last bitmap added to the compressed file is within 15 frames of the current frame. Other types of modifications, such as removing the separate step of recording modifications to the master media file [201] and replacing it with logic performed during an encoding sequence which identifies identical frames in the original and modified master media files are also possible. Accordingly, the modified sequence illustrated in FIG. 3 should be understood as being illustrative only, and not be treated as implying limitations on the scope of protection provided by this document or any related document.

As will be immediately apparent to those of ordinary skill in the art, the specific format and encoding scheme described previously is intended to provide a context in which the inventor's technology can be illustrated, and is not intended to imply that the inventor's technology can only be applied in situations where that specific encoding scheme, or an encoding scheme of similar simplicity, is used. For example, there are many media file formats in which information is stored as keyframes (i.e., frames which are encoded in a manner which will result in the same material being presented regardless of the other frames in the file) and interframes (i.e., frames which are encoded in a manner which can result in different material being presented if there are modifications to the other frames in the file). These formats will likely not use uncompressed bitmaps as keyframes, and will likely use more sophisticated techniques than simple pixel comparison with the previous keyframe to generate interframes. However, the technology described herein can still be applied to these types of formats by taking into account their specific keyframe formats and interframe generation techniques while maintaining keyframe information, preserving keyframes in a compressed version of a modified media file, and calculating the interframes using the preserved keyframe data, all of which are demonstrated (albeit in simplified form) in FIG. 2.

Figure 4:
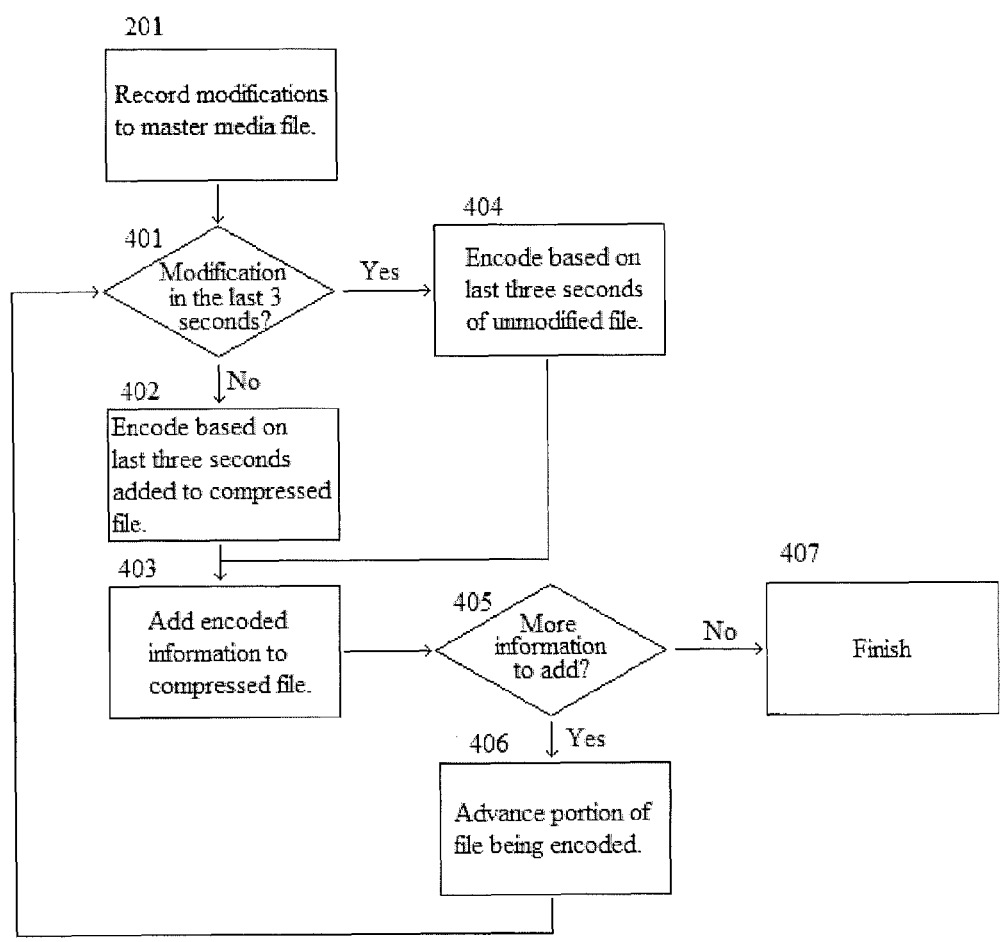
FIG. 4 illustrates a process which can use information from an unrevised version of a file when serializing a revised version of a file.

In addition to being applicable to keyframe and interframe based compression techniques other than those described in the context of FIG. 2, the inventors' technology can also be applied to compression techniques which do not use frame information. To illustrate, consider a media format which uses a compression scheme which identifies data in an uncompressed media file which is unlikely to be perceived by a consumer based at least in part on what the consumer has already seen or heard, then omits that data when creating a compressed version of the uncompressed media file. An example of a process in which the inventors' technology could be applied to this type of compression scheme is provided in FIG. 4. In that process, a compressed version of a media file is created in which the information added to a compressed media file for each second of an uncompressed media file is based on the preceding three seconds of information added to the compressed media file. As with the encoding scheme of FIG. 2, the scheme used in FIG. 4 is a simplified example to illustrate how the technology disclosed herein can be implemented. The approach shown in that figure could be applied to other, more complicated types of compression by those of ordinary skill in the art without undue experimentation by accounting for what is used to determine the information included in the compressed media file in those compression types.

The process of FIG. 4, like the process of FIG. 2, begins with recording the modifications made to the master media file [201]. This could be achieved by identifying the time signatures of the locations in the master media file where changes are made, though variations, such as those described previously in the context of FIG. 2, are possible as well. After the modifications to the master media file had been made, and the process of creating a compressed version of the modified master media file begins, a check [401] would be performed if any of the modifications were in the previous three seconds of information which had been added to the compressed file. If the answer to this is no, then the current information from the modified file is encoded based on the previous three seconds of information added to the compressed file [402] and added to the compressed file [403]. Alternatively, the information to be added to the compressed file is encoded based on the previous three seconds of information from the unmodified file [404] before being added to the compressed file [403]. Once the information has been added [403], a check [405] will be performed on whether there is more information in the modified file that has not been added to the compressed file. If there is not, the process will terminate [407], otherwise, the portion of the modified master file being encoded will advance (e.g., move to the next second to be encoded), and the process will loop back to the check [401] at the beginning of the encoding sequence.

Other modifications are also possible. For example, in the processes of FIGS. 2-4, a compressed version of a modified master media file was created by re-encoding and adding information to the compressed version of the modified master media file even if the information was already available in a compressed version of the master media file which had been created previously. However, in some situations, it may be possible to avoid some of this processing when creating a compressed version of the modified master media file. For example, consider a case in which, when a compressed version of a master media file is created, data is captured showing how the specific information in the compressed file corresponds to the information in the master media file. Using this type of data, rather than re-encoding a new compressed file when a change is made to the master media file, a compressed version of the modified master media file could be created by copying portions of the existing compressed file which correlate to unchanged portions of the master media file into a new compressed file. An exemplary process which could be implemented based on this approach to create a compressed version of a modified master media file using a keyframe based compression scheme such as described previously is shown in FIG. 5.

Figure 5:
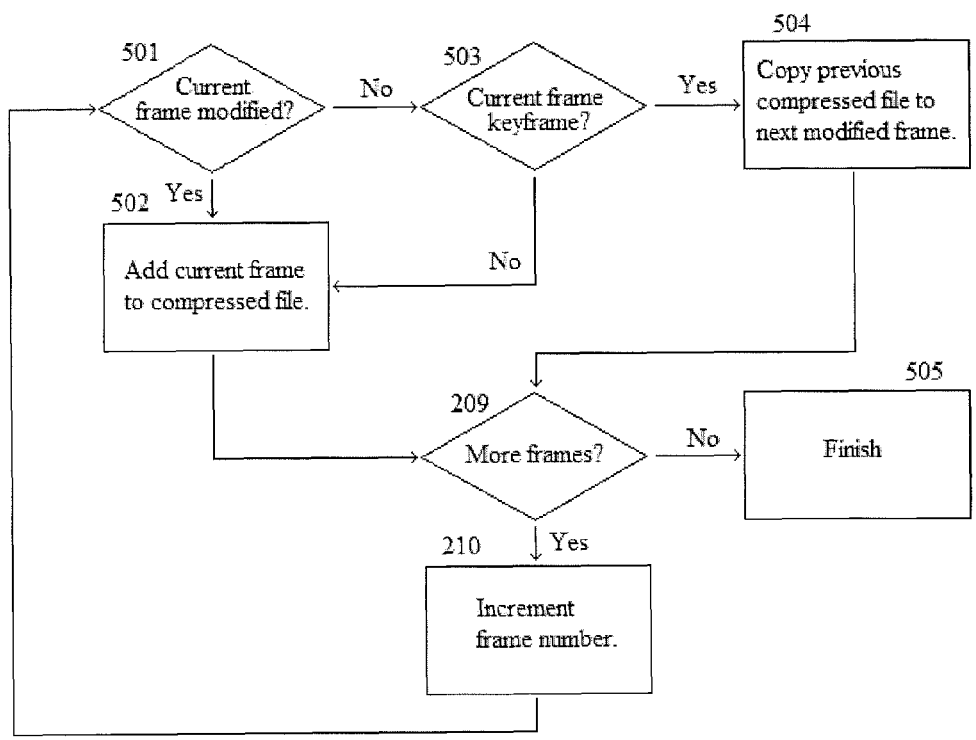
FIG. 5 illustrates a process which can use information from an unrevised version of a file when serializing a revised version of a file.

In the process of FIG. 5, initially, a check [501] will be made to determine if the current frame to be added to the compressed file was modified, or if it is the same as in the original version of the master media file. If the current frame was modified, or if it was not encoded as a keyframe in the previously created compressed file, then it is added [502] to the compressed file, such as using techniques such as described previously. Alternatively, if the current frame is not modified and a check [503] indicates that it was ended as a keyframe in the previously created compressed file, then the portion of the previously created compressed file starting with that keyframe, and ending at (but not including) the next frame which was modified is added [504] to the new compressed file being created. Then, once either the copied portion of the previously created compressed file or the current frame had been added to the new compressed file, a check [209] of whether there are more frames would be performed, and the process would either move to the next frame [210] or finish [505] (e.g., by creating a configuration file showing which frames were encoded as keyframes in the new compressed file).

Of course, this same approach could be applied in non-keyframe based compression schemes as well. For example, in a compression scheme such as discussed in the context of FIG. 4 where information from a master media file is added to a compressed file based on the previous three seconds of material which had been added to the compressed file, instead of re-encoding a new compressed file as described in the context of FIG. 4, the portions of the original compressed file which correspond to portions of the master media file which were not changed could be copied into the new compressed file. Accordingly, the discussion of approaches to creating new compressed files without re-encoding set forth in the context of FIG. 5 should be understood as being illustrative only, rather than as being limiting on the scope of protection provided by this document or any related document.

While the above disclosure explained how the inventors' technology could be beneficially applied in an environment in which updated compressed versions of a master media file are to be distributed to multiple remote locations, this technology can be used in a variety of concrete situations, including situations which do not involve distribution of compressed versions of a master media file to multiple remote locations. For example, the techniques described herein could be used to facilitate transferring data between two locations, such as between a remote rendering farm and a computer on which changes to a base media file could be made, or between a control computer and a remote data repository.

Similarly, the inventors' technology could be used for transfer of files other than media files in which user-perceptible changes to one portion of a file will cause changes to other portions which are not user-perceptible, but which could potentially interfere with or reduce the benefits of delta encoding. To illustrate, consider the case of an image encoded using the SVG format. In that format, different features of an image are expressed as elements defined by attributes. Thus, it is possible that a very small change in an SVG file used to store an image (e.g., changing the value of a parameter in an element representing a shape) could have a very large change when that image is rendered for the user (e.g., the shape could be moved from one side of the screen to another). However, as set forth below, even in this type of situation, the inventors' technology could be used to facilitate the process of delta encoding and/or transferring modified versions of the SVG image.

A concrete example of how the inventors' technology could be applied to a format, such as SVG, in which a small change to a file could have a large change when the contents of that file are viewed by a user is provided in the following discussion of FIGS. 6a and 6b. In those figures, FIG. 6a shows how an image consisting of a circle, a rectangle, and a triangle can be encoded using the SVG format. FIG. 6b shows how a modified version of that image could be stored in a file which is also used to store information which could be used in later transferring and/or delta encoding the modified image. In particular, in FIG. 6b, rather than simply including the information necessary to represent the modified image, the depicted markup language includes an additional element (set forth between opening and closing <deltainfo> tags [601][602]) indicating that the file includes information on what has changed relative to the base document specified by the baseDocumentID attribute [606] (which attribute could have a value such as a hash or signature of the base document, or a globally unique identifier which had been assigned to the base document). Within that additional markup language element, there is a further element [603] showing that the element with the id "circle1" appears in the modified image at a position which is 50 pixels to the right of its position in the original image.

There several ways in which data such as shown in the element between the opening and closing <deltainfo> tags [601][602] of FIG. 6b could be used to facilitate delta encoding and/or transfer of the modified image. For example, information identifying a base document storing the image from which the modified image was derived can allow a delta encoding system (which might otherwise have had to perform repeated signature comparisons) to identify the existing file which is most similar to the file for the modified image simply by reading the file for the modified image. Similarly, when transferring the modified image to a location where the base document is already present, the element [603] identifying specific changes made to the base document can allow a delta encoding system where the modified image resides to avoid going through a separate identification of information common to the modified image and the base document. Indeed, in some cases, it is possible that information such as shown in the element specifying changes [603] could even be used to eliminate the need for delta encoding separate from serialization. For example, where the base document is already present at the location to which the modified image is to be transferred, the transfer could be achieved by sending the information between the opening and closing <deltainfo> tags [601][602] to a suitably programmed computer at the receiving location so that the computer could use the information to derive a file for the modified image from the base document.

It is also possible that information such as shown in FIG. 6b could be used to account for variations between the documents which are available at various sites. To illustrate, consider a case where a modified image is to be replicated to multiple locations, each of which may have a slightly modified version of the base document (e.g., a new version of the original image created by a local design team). In this type of situation, the modified image could be serialized into a file which includes multiple instances of the information shown in FIG. 6b between the <deltainfo> tags, one for each variation on the base document at each location to which the modified image is to be replicated. Then, when it was time to replicate the modified image to a particular remote site, the information about how to derive the modified image from the version of the base document available at that site could be used to optimize the process, even though the remote site may not have a pristine version of the base document from which the modified image was created.

Other information beyond that shown in FIG. 6b could also be used to facilitate delta encoding and/or transfer of the modified image. For example, in some implementations, rather than (or in addition to) including information such as shown in FIG. 6b, a file for a modified image could include information identifying a preferred block size (potentially accompanied by pre-calculated block signatures for that preferred block size) to use when identifying the most similar file and/or when creating a patch file for deriving the file for the modified image from the most similar file. This preferred block size, for example, could be set based on examination of the performance of a delta encoding system when using different block sizes with the type of file to be transferred, or could be set based on the size of the elements in the file to be transferred (e.g., the preferred block size could be set to the disk space necessary to store the smallest element in the file to be transferred, or to the preferred block size could be set equal to the largest common denominator of the sizes of the individual elements in the file to be transferred). This type of block size information could also be included on an element by element basis when creating a file for a modified image ($F_{mod}$), and be used during later creation of a patch ($F_{sim} \rightarrow F_{mod}$ patch) for deriving the file for that modified image from a similar file ($F_{sim}$) at a location to which the modified image is to be replicated. Processes which could be used for these purposes are illustrated in FIGS. 7 and 8, each of which is discussed below.

Figure 7:
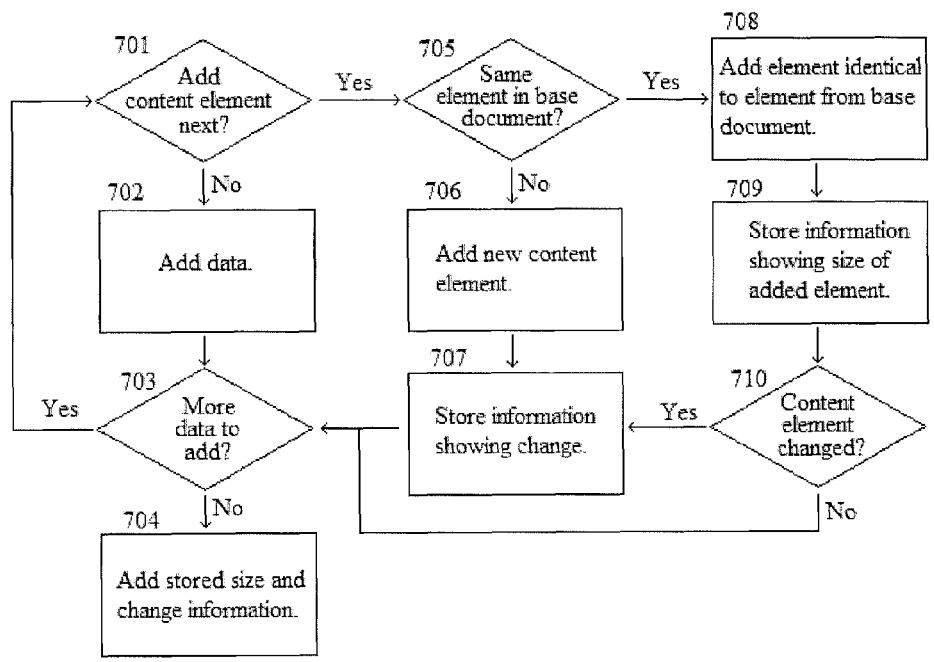
FIG. 7 illustrates a process which can be used to capture preferred block size information on an element by element basis when serializing a modified version of baseline data.
Figure 8:
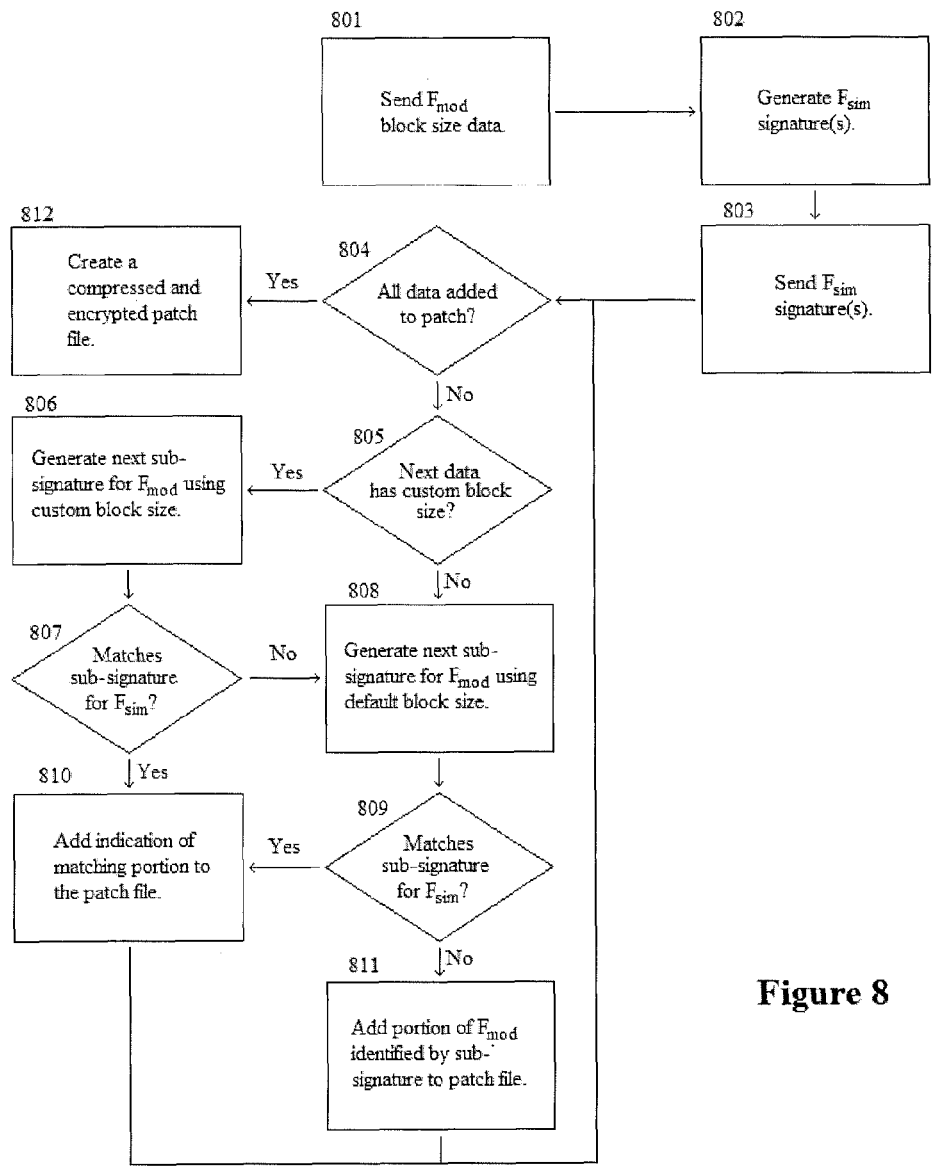
FIG. 8 illustrates a process in which element by element block size information can be used to create a patch for deriving a modified version of a base document from a similar file.

Turning first to FIG. 7, the process depicted in that figure starts with a check [701] of whether the next data to be added to the file being created corresponds to a content element (e.g., a rectangle, circle or polygon as illustrated in FIGS. 6a-6b). If the next data to be added is not part of a content element, then the data would simply be added [702] to the new file (i.e., to $F_{mod}$), and a new check [703] would be run to determine if there was more data to add to the new file. If there was not, then any information regarding the size of the elements in the modified image and changes from a base document (e.g., information such as shown between the opening and closing <deltainfo> tags [601][602] in FIG. 6b) would be added [704] to the new file, and the process would terminate. Otherwise, if there was more information to add, the process would loop back to check [701] whether the next data to add was part of a content element.

If the check [701] showed that the next data to add to the new file was part of a content element, the process of FIG. 7 would continue by checking [705] if the same content element also existed in the base document. This check could be performed, for example, by using data captured during modification of a base document to determine if the content element from the modified image being serialized was part of the base document, or one of the changes between the modified image and the base document was addition of the content element being serialized to the image from the base document. If the check [705] showed that the content element whose data is being serialized was not present in the base document, the new content element would be added [706] to the file being created (i.e., to $F_{mod}$) and information showing how the most recently added element differed from the base document (e.g., that the most recently added element was not present in the base document) would be stored [707] for later addition to the file being created.

Alternatively, in the process of FIG. 7, if the check [705] showed that the content element corresponding to the data being added to the file being created was present in the base file, then the version of that element from the base file would be added to the file being created [708]. After the version of the content element from the base file had been added [708], the process of FIG. 7 would continue by storing [709] information showing the size of the added content element and checking [710] if the version of the content element from the modified image differed from the version of the content element from the base document. If the version of the content element in the modified image differed from the version of the content element in the base document, then information showing how the content element had been changed would be stored [707] (e.g., if the content element had been moved five pixels to the left in creating the modified image, then information showing that the modified content element could be obtained by moving the content element from the base document five pixels to the right could be stored). Otherwise, the process of FIG. 7 would check [703] if there was more data to add to the file being created, and either loop back to the original check [701] or add [704] the stored size and change information to the file being created as appropriate.

Turning now to FIG. 8, that figure provides an illustration how block size information such as might be captured in a process like FIG. 7 could be used to facilitate later creation of a patch ($F_{sim} \rightarrow F_{mod}$ patch) showing how to derive the file for a modified image (i.e., $F_{mod}$) from a similar file at a receiving location ($F_{sim}$). Initially, in the process of FIG. 8, a computer at the location where the $F_{sim} \rightarrow F_{mod}$ patch will be created will send [801] block size data for $F_{mod}$ to the location at which $F_{mod}$ is to be replicated. This information could include, for example, a block size which had been observed to work particularly well for files of the same format as $F_{mod}$, a preferred block size derived from the sizes of the elements in $F_{mod}$, block sizes for any content elements included in both $F_{mod}$ and the base document from which the modified image of $F_{mod}$ was created, and/or combinations of the above (e.g., block sizes for individual content elements in $F_{mod}$, as well as a preferred block size which could be used to facilitate the encoding of non-content element data in $F_{mod}$).

Once the block size data had been received at the receiving site, that data would be used to generate [802] one or more signatures for the most similar file at the receiving site (i.e., $F_{sim}$). The specific signature(s) to be created could vary depending on the information available and the particular manner in which the computer generating [802] the signature(s) was configured. For example, a single signature file could be created comprising sub-signatures generated using a default block size for portions of $F_{sim}$ where no other block size was specified in the $F_{mod}$ block size information, and using the sizes from the $F_{mod}$ block size information for other portions of the file. Alternatively, a signature could be created for each of the block sizes in the $F_{mod}$ block size information, with each signature comprising sub-signatures generated using one of the block sizes from the $F_{mod}$ block size information. Other alternatives, such as where a signature was created for each block size specified in the $F_{mod}$ block size information, and where one or more signatures were created comprising sub-signatures generated using different block sizes (e.g., if the $F_{mod}$ block size information included multiple default block sizes) could also be implemented, and will be immediately apparent to those of ordinary skill in the art in light of this disclosure. Accordingly, the examples given above should be understood as being illustrative only, and not limiting.

Continuing with the process of FIG. 8, once the signature(s) for $F_{sim}$ had been generated [802], those signature(s) would be sent [803] to the site which would create the $F_{sim} \rightarrow F_{mod}$ patch, and a patch creation sequence would take place at that site. As shown in FIG. 8, this patch creation sequence could begin with a check [804] of whether all data showing how to derive $F_{mod}$ from $F_{sim}$ had been added to the patch. If not, then a further check [805] would be performed to determine if the next data to be added to the $F_{sim} \rightarrow F_{mod}$ patch had a custom block size. This check [805] could be performed, for example, by checking if the data was at the beginning of a portion of $F_{mod}$ associated with a custom block size in the $F_{mod}$ block size data, and, if it was not, treating it a not being associated with a custom block size. If the check [805] found that there was a custom block size, then the next sub-signature for $F_{mod}$ would be generated [806] using that custom block size. Alternatively, if there was not a custom block size, or if there was a custom block size, but a determination [807] was made that the sub-signature generated using that custom block size did not match any sub-signature in the signature(s) for $F_{sim}$, the next sub-signature for $F_{mod}$ would be generated [808] using a default block size. If this sub-signature was determined [809] to match a sub-signature for $F_{sim}$, then an indication of the matching portion of $F_{sim}$ would be added [810] to the $F_{sim} \rightarrow F_{mod}$ patch. Otherwise, if there was no match, then the portion of $F_{mod}$ identified by the non-matching sub-signature would be added [811] to the $F_{sim} \rightarrow F_{mod}$ patch, and the process would return to check if there was more data to add to the patch, and would then create [812] a compressed and encrypted patch file or iterate as appropriate.

Of course, it should be understood that, while the above discussion of FIGS. 7 and 8 provided examples of how block size information could be added to a file during serialization and used during later delta encoding, the technology disclosed herein is not limited to being implemented using the specific exemplary steps and processes discussed in the context of FIGS. 7 and 8. To illustrate one such possible variation, consider the fact that the discussion of FIG. 8 included steps [802][806][808] of generating sub-signatures for portions of $F_{sim}$ and $F_{mod}$ during the process of creating the $F_{sim} \rightarrow F_{mod}$ patch. While this discussion illustrated one way in which an $F_{sim} \rightarrow F_{mod}$ patch could be created, the disclosed technology could also be implemented to generate some or all of the sub-signatures in advance. For example, sub-signatures for portions of $F_{mod}$ corresponding to custom block sizes could be created and stored as part of storing [707] information showing changes from a base file in a modified version of the process of FIG. 7, while a signature for $F_{sim}$ comprising sub-signatures created with a default block size could be generated in advance by an offline process a time when there was low demand for processor resources. Similarly, while FIG. 8 illustrated a process which included sending [803] the signature(s) for $F_{sim}$ to the location where the $F_{sim} \rightarrow F_{mod}$ patch would be created, it is possible that this step would be omitted in some cases, such as where both $F_{mod}$ and $F_{sim}$ were present at the location where the $F_{sim} \rightarrow F_{mod}$ patch was to be created. This would likely be the case for a cloud based transfer service such as discussed in U.S. Pat. No. 8,244,831, or if $F_{sim}$ was actually the base document from which the modified image of $F_{mod}$ was derived. Accordingly, FIGS. 7 and 8 and the accompanying discussion should not be treated as limiting on the protection accorded by this document, or by any related document.

Variations on the processes discussed in the context of FIGS. 6a and 6b are also possible in areas beyond the storage of block size or signature information for particular element (which, as discussed previously, may not be included in systems implemented using the disclosed technology). For example, as discussed previously, it is possible that the disclosed technology can account for variations in information available at different sites by including multiple instances of data such as shown between the <deltainfo> tags of FIG. 6b in a file for a modified image. However, the disclosed technology can also be implemented in manners which account for variations between sites without requiring multiple instance of change information. For example, rather than including multiple <deltainfo> tag sets in a single file, it is possible to account for differences in information available at different sites by configuring the computers which would receive information showing how a file to be replicated differs from a base document to derive the file to be replicated using the information at hand. This could be done by configuring those computers to back out changes in their versions of the base document (e.g., a computer could derive a copy of the file shown in FIG. 6a from the file shown in FIG. 6c by subtracting the specified change (i.e., −50) from the "y" attribute of the element in FIG. 6c with the id "rect1") to obtain a pristine version of the base document which could then be used to derive the file to be replicated, or to create a comprehensive change package by combining the inverse of the changes in the local version of the base document with the changes in the file to be replicated then to apply the comprehensive change package to the local version of the base document to obtain the file to be replicated.

Other approaches to addressing the potential existence of different version of a base document are also possible. For example, as illustrated in the process of FIG. 7, the disclosed technology can be used to implement a system in which, rather than serializing a modified image into a file which includes both the modified image and change information showing how that information differs from a base document, a modified image can be serialized into a file which includes the image from which the modified image was derived and information showing how the modified image can be derived from the pristine version. In a system implemented to use this type of serialization, all versions of a base document would include the base document's data combined with change information which would be used to tell a computer accessing those versions of the base document how the information which should be presented to a user could be derived from the information from the base document. Thus, in this type of implementation, any version of a base document could be derived from any other version simply by replacing one set of change information with another.

As a further example of a feature which could be used to account for changes between versions of a document, consider how the disclosed technology could be used to implement a system supporting multiple approaches to serialization. For example, a baselining approach could be used, in which a computer could be configured to serialize information differently depending on the context in which the serialization takes place. To illustrate, consider the possibility of using different approaches to serialization when a file is to be treated as a modified version of an existing base document and when the file is to be treated as a new base document. In this type of implementation, when a file is to be treated as a new base document (e.g., because a user selects an option that a document is to be used as a basis for future collaboration between groups, or because the changes in a version of a base document are so substantial as to dwarf the information from the original version of a base document) it could be saved in a form in which all of the file's content was stored in a self contained manner (e.g., an SVG image, as shown in FIG. 6a). By contrast, when a file is to be treated as a modified version of an existing base document, it could be serialized in the form of a copy of the base document and a set of change information. It is also possible that multiple approaches to serializing could be used simultaneously. For example, when a modified version of a base document is serialized, two files could be created, one in which the file's content is stored in a self contained manner, and another in which the file's content is stored as a copy of the base document and a set of change information. The different files could then be used selectively when replicating the modified version of the base document, depending on the information available at the site to which the modified version of the base document was to be replicated.

Of course, combinations of the above approaches to addressing the potential existence of different versions of a document are also possible. To illustrate, consider the approaches of baselining and maintenance of multiple versions of change information for a single file. These approaches can be combined in a system which supports the inclusion of a change log when serializing a modified version of a document. In such a system, whenever a modified version of a base document is identified as one which should be used as a new base document, the content for that document can be stored in a self contained manner, and accompanied by change information showing how that self contained content differed from the content in a previous base document (e.g., as shown in FIG. 6b). This change information could then be maintained in the event a revised version of the new base document is itself selected for use as a base document, resulting in each document derived from a common source containing a record of its preceding base documents, and of its changes from the most recently preceding base document. Such information could then be used to optimize the process of creating a patch between two documents by identifying those documents' most recent common baseline, using the stored change information to identify how each of those documents differed from the common baseline, then creating a patch file by treating the two documents as modified versions of the baseline (e.g., using a process such as shown in FIG. 8). Other combinations and variations (e.g., inclusion of additional information in a change log) are also possible, and could be implemented by those of ordinary skill in the art in light of this disclosure without undue experimentation. Accordingly, the examples given above should be understood as being illustrative only, and should not be treated as limiting.

Just as the above examples should not be treated as implying limitations on the ways in which the disclosed technology can be implemented to account for variations in data between sites, the fact that those examples, as well as preceding discussion of serialization of media files, were set forth using specific formats and data types should not be treated as implying that the disclosed technology is limited to facilitating the transfer and/or delta encoding of those specific types or formats of data. For example, by using the above techniques, a modified version of the text encoded in the illustrative XML file of table 2 could be serialized into a file which includes both the baseline data of table 2 as well as information showing how the modified text can be derived from that data. Tables 3 and 4 illustrate these types of files. In those tables, table 3 illustrates a file which includes both the baseline data from table 2 as well as change information in the form of a RegExp instruction (i.e., "s/Cincinnati/Blue Ash/") which could be applied to the identified portion of the baseline data to obtain the modified text. Table 4 then illustrates a file which includes both the baseline data of table 2, as well as a self contained expression of the modified text, and change information showing how the modified text could be derived from the original text. With this type of file, an application which would be used to view the revised text could read the self contained expression of the revised text, while a data transfer application could selectively send the change information, or the original data plus the change information depending on whether a copy of the baseline data was already available at the location to which the data was being transferred.

TABLE 2

Exemplary baseline serialized data in XML format.

```
<xml>
    <data>
        <variable_1>Hello World</<variable_1>
        <variable_2>Cincinnati, Ohio</<variable_2>
    </data>
</xml>
```

TABLE 3

Exemplary revised serialized data expressed in XML format as baseline data plus change information.

```
<xml>
    <data>
        <variable_1>Hello World</<variable_1>
        <variable_2>Cincinnati, Ohio</<variable_2>
    </data>
    <diffdata version=2>
        <variable_2>s/Cincinnati/Blue Ash/</variable_2>
    </diffdata>
</xml>
```

TABLE 4

Exemplary revised serialized data expressed in XML format as self contained revised data and as baseline data plus change information.

```
<xml>
    <data>
        <variable_1>Hello World</<variable_1>
        <variable_2>Blue Ash, Ohio</<variable_2>
    </data>
    <diffdata version=2>
        <original_data>
            <variable_1>Hello World</<variable_1>
            <variable_2>Cincinnati, Ohio</<variable_2>
        </original_data>
        <variable_2>s/Cincinnati/Blue Ash/</variable_2>
    </diffdata>
</xml>
```

The disclosed technology can also be used with more complicated formats or data types. For example, arbitrary binary data can be represented as a collection of objects using technologies such as Microsoft's structured storage or other approaches which use filesystem like information to organize different portions of the file. This arbitrary binary data objects can then be treated individually and optimized for transfer and/or delta encoding in much the same manner as the elements discussed in the context of FIGS. 6a-6b and tables 2-4. Similarly, rather than being limited to implementations where change information is set forth as human readable modifications to particular attributes, change information could also take the form of binary delta information showing how to derive modified data from baseline information (e.g., an original file or portion thereof), or of a record of changes made by a user in creating modified data (e.g., an editing program could be configured to capture user changes as they are being made and to, essentially, use them to create a macro which would be stored when the modified data is serialized).

Other variations, such as where information described in the above examples as being included in the same file as a set of modified content is actually stored in a separate configuration file, or where a user can be allowed to incorporate different elements from different base documents, and change information can be stored showing the sources of, and changes made to, each element, are also possible, and will be immediately apparent to those of ordinary skill in the art. Accordingly, instead of limiting the protection accorded by this document, or by any document which is related to this document, to the material explicitly disclosed herein, the protection should be understood to be defined by the following claims, which are drafted to reflect the scope of protection sought by the inventors in this document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to the claims based on the above disclosure or the incorporated priority documents is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

Explicit Definitions

When used in the claims, "allocating" things "among" targets should be understood to refer to distributing or assigning the things allocated to the targets such that, if the number of things being allocated is greater than or equal to the number of targets, then each thing target has a different thing assigned or distributed to it, or, if the number of things being allocated is less than the number of targets, then each thing is distributed or assigned to a different target. It should be understood that a subject described as "allocating" things "among" targets is not necessarily the only entity performing acts as part of the allocation. For example, if a computer is defined as allocating files among a set of nodes, then this allocation could take place by adding the files to a queue from which they could be retrieved by the nodes.

When used in the claims, the phrase "at each" followed by a noun or noun phrase and one or more actions, should be understood to mean that each action from the one or more actions is performed by each of the entities represented by the noun or noun phrase.

When used in the claims, "based on" should be understood to mean that something is determined at least in part by the thing that it is indicated as being "based on." When something is completely determined by a thing, it will be described as being "based EXCLUSIVELY on" the thing.

When used in the claims, a statement that something "completely accounts for" some object should be understood to mean that the entirety of the object is encompassed by the entity or entities which "completely account for" it. For example, a two kilobyte file is "completely accounted for" by a set of portions comprising a first portion made up of the first kilobyte of the file and a second portion made up of the second kilobyte of the file.

When used in the claims, "comprises" should be understood to mean includes, but is not limited to. For example, the months of the year could be described as "comprising" January, July, and October. Similarly, a statement that something is "comprised by" some entity should be understood to mean that the entity comprises the thing it is described as "comprised by". For example, January, July and October could be described as "comprised by" the months of the year. It should be understood that the "comprises" relationship is transitive. For example, the statements that the months of the year "comprise" the months of spring, and that the months of spring "comprise" April, necessarily imply that the months of the year comprise April. The statements that April is "comprised by" the months of spring, and that the months of spring are "comprised by" the months of the year, necessarily imply that April is "comprised by" the months of the year.

When used in the claims, "computer" should be understood to refer to a device, or group of devices, which is capable of performing one or more logical and/or physical operations on data to produce a result. Non-limiting examples of "computers" include, multiprocessor or multicore systems, servers, laptops, desktops, netbooks, and notebooks, as well as handheld devices such as cellular phones, personal digital assistants, and portable game consoles.

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft WORD on a computer "configures" that computer to function as a word processor, which it does by using the instructions for Microsoft WORD in combination with other inputs, such as an operating system, and various peripherals (e.g., a keyboard, monitor, etc).

When used in the claims, a statement that a thing is "designated as" something else should be understood as meaning that the thing is treated as the thing which it is "designated as". This is similar to the computer programming concept of using the return value of a function, where the statement that the return value obtained by performing the function FOO is designated as the result would be roughly equivalent to the programming command RESULT=FOO( );.

When used in the claims, to "determine" something should be understood to refer to the act of generating, selecting or otherwise specifying the thing "determined". For example, to obtain an output as the result of analysis would be an example of "determining" that output. As a second example, to choose a response from a list of possible responses would be a method of "determining" a response.

When used in the claims, the phrase "for each", followed by a noun or noun phrase, should mean that the statement or statements following the noun or noun phrase apply to each entity referred to by the noun or noun phrase. For example, a statement that, for each direction comprised by the cardinal direction, there is a prayer corresponding to the direction, should be understood to mean that there is a prayer corresponding to north, a prayer corresponding to east, a prayer corresponding to south, and a prayer corresponding to west. When interpreting phrase having the "for each" construction, it should be understood that the "for each" construction describes what applies to the specified objects, and does not necessarily imply additional ordering or structure. For example, the statement that "for each" letter comprised by the first four letters of the alphabet, a sheet of paper has three copies of the letter, would be true for a sheet of paper on which "a b c d a b c d a b c d" was written, and would also be true for a sheet of paper on which "a a a b b b c c c d d d" was written.

When used in the claims, a "functionally derived value" should be understood to be a value which is obtained by performing one or more mathematical or logical operations on the information it is "derived" from. Examples of "functionally derived values" include hash values and checksums.

When used in the claims, an "interframe" should be understood as referring to a frame encoded in a manner which is reliant at least in part on other frames.

When used in the claims, a "keyframe" should be understood to be a frame encoded independently of other frames.

When used in the claims, a statement that some data, such as a file, is "local" to a computer should be understood to mean that the computer can access the data without using a wide area network or sneakernet.

When used in the claims, the phrase "means for transfer optimized serializing of data" should be understood as a means+function limitation as provided for in 35 U.S.C. §112 (f), in which the function is "transfer optimized serializing of data" the corresponding structure is a computer configured to perform processes such as illustrated in FIGS. 2-4, and 7, and discussed in the context of creating files storing data such as shown in FIGS. 6b-6c, as well as the variations on those processes described in the corresponding disclosure.

When used in the claims, the word "node" should be understood to refer to a processing location. Examples of "nodes" include computers, and virtual computers.

When used in the claims, "non-transitory computer readable medium" should be understood to refer to any object, substance, or combination of objects or substances, capable of storing data or instructions in a form in which they can be retrieved and/or processed by a computer. Computer memory such as hard discs, read only memory, random access memory, solid state memory elements, optical discs and registers are examples of "non-transitory computer readable media." However, for the avoidance of doubt "non-transitory computer readable media" should not be understood as including ephemeral transmissions, such as propagating signals.

When used in the claims, the phrase "performing" a specified process "with" some data "as" a value should be understood as analogous to the computer programming concept of calling a function with arguments. For example, "performing a BMI calculation process with 500 as an input weight and 1 as an input height" should be understood as analogous to calling calculateBMI(500, 1). Similarly, a description of steps from the specified process should be understood as being analogous to the implementation of a function. For example, a statement that "performing the BMI calculation process comprises calculating a denominator by squaring the input height and determining a return BMI dividing the input weight by the denominator" would be equivalent to code set forth in table 2:

TABLE 2 illustrative code

```
float calculateBMI(float input_weight, float input_height)
{
    float denominator = float input_height * float input_height;
    float return_BMI = input_weight/denominator;
    return return_BMI;
}
```

Because of this equivalence, a method which included steps of "determining a first BMI by designating a return BMI obtained by performing a BMI calculation process with 500 as an input weight and 1 as an input height as the first BMI" and "determining a second BMI by designating the return BMI obtained by performing the BMI calculation process with 100 as the input weight and 3 as the input height as the second BMI" would result in the first BMI being different from the second BMI, just as a call to calculateBMI(500, 1) would have a different return value than a call to calculateBMI(100, 3).

When used in the claims, the term "portion" should be understood as referring to a section or part of a thing. It should be understood that the term "portion" can refer to the thing itself (i.e., the "portion" corresponds to the whole).

When used in the claims, "providing" something should be understood to refer to making that thing available to that which it is "provided" to. "Providing" should be understood broadly to refer to direct methods of making something available (e.g., sending a file to a receiving computer) and more complicated procedures (e.g., sending the receiving computer a URL from which it could retrieve the file for a limited time).

When used in the claims, "server" should be understood as a term which is synonymous with "computer," and which is used in preference to "computer" to improve the readability of the claims in which it appears.

When used in the claims, the term "set" should be understood to refer to a number, group, or combination of zero or more things.

When used in the claims, the term "storing" used in the context of a memory or computer readable medium should be understood to mean that the thing "stored" is reflected in one or more physical properties (e.g., magnetic moment, electric potential, optical reflectivity, etc) of the thing doing the "storing" for a period of time, however brief.

When used in the claims, a "signature" which corresponds to something should be understood to refer to data which can be used to identify that which it corresponds to. Examples of signatures which might correspond to files include hash values for those files (which provide identifications for files which are effectively unique), and checksums for those files (which provide identifications which are not as unique as those provided by hash values, but which are generally easier to calculate and store).

When used in the claims, "sub-portion" should be understood as a term which is synonymous with "portion," and which is used in preference to "portion" to improve the readability of the claims in which it appears.

When used in the claims, "sub-set" should be understood as a term which is synonymous with "set," and which is used in preference to "set" to improve the readability of the claims in which it appears.

When used in the claims, "sub-signatures" should be understood as a term which is synonymous with "signature," and which is used in preference to "signature" to improve the readability of the claims in which it appears.

We claim:

1. A method comprising:
   a. storing, in a database communicatively connected to a first computer, a first file, the first file storing a base set of data in serialized form;
   b. at the first computer, making one or more changes to the base set of data; and
   c. serializing a modified set of data into a second file, wherein the modified set of data is a set of data obtained from the base set of data based on the one or more changes, wherein serializing the modified set of data comprises performing a first serialization process comprising, for each of a plurality of portions of the modified set of data:
      A. determining if a change to a corresponding portion of the base set of data was included in the one or more changes to the base set of data, wherein the corresponding portion of the base set of data corresponds to the portion of the modified set of data;
      B. if no change to the corresponding portion of the base set of data was included in the one or more changes to the base set of data, adding, to the second file, data identical to a portion of the first file encoding the corresponding portion of the base set of data in serialized form; and
      C. if a change to the corresponding portion of the base set of data was included in the one or more changes to the base set of data, adding, to the second file, data encoding the portion of the modified set of data in serialized form,
   wherein serializing the modified set of data further comprises adding, to the second file, a plurality of block size indications to the second file, and
   wherein the method further comprises creating a signature for the second file, the signature for the second file comprising a plurality of sub-signatures, the plurality of sub-signatures comprising, for each of the plurality of block size indications, a sub-signature identifying a portion of the second file having a size corresponding to the block size indication.

2. The method of claim 1 wherein the method comprises performing a second serialization process comprising:
   a. adding a serialized version of the base set of data to the second file, wherein the serialized version of the base set of data added to the second file is identical to the serialized form in which the base set of data is stored in the first file; and
   b. adding a set of change information to the second file, the set of change information reflecting the one or more changes to the base set of data.

3. The method of claim 2, wherein the second serialization process comprises adding, to the second file, a signature corresponding to the first file.

4. The method of claim 3, comprising:
   a. replicating the second file to a second computer, wherein the second computer is located remotely from the first computer; and
   b. at the second computer, deserializing the modified set of data from the replicated copy of the second file, wherein deserializing the modified set of data from the replicated copy of the second file comprises making the one or more changes indicated in the set of change information from the replicated copy of the second file.

5. The method of claim 4, wherein replicating the second file to the second computer comprises, based on a determination that the serialized version of the base set of data is available at the second computer, sending the set of change information to the second computer.

6. The method of claim 5, wherein the determination that the serialized version of the base set of data is available at the second computer is made by determining that a file into which data derived from the base set of data was serialized is available at the second computer.

7. The method of claim 5, wherein the determination that the serialized version of the base set of data is available at the second computer is made by performing steps comprising determining that there exists an ancestor set of data from which both the base set of data and a set of data serialized into a file at the second computer were derived.

8. A machine for facilitating the transfer of modified sets of data, the machine comprising:
   a. a database storing a first file, the first file storing a base set of data in a serialized form, the database communicatively connected to a first computer;
   b. a memory, the memory storing a set of instructions to configure the first computer to serialize, into a second file, a modified set of data obtained from the base set of data based on one or more changes made to the base set of data using the first computer;
   c. the first computer, wherein the first computer is configured by the set of instructions to perform a first serialization process comprising, for each of a plurality of portions of the modified set of data:
      A. determining if a change to a corresponding portion of the base set of data was included in the one or more changes to the base set of data, wherein the corresponding portion of the base set of data corresponds to the portion of the modified set of data;
      B. if no change to the corresponding portion of the base set of data was included in the one or more changes to the base set of data, adding, to a second file, data identical to a portion of the first file encoding the corresponding portion of the base set of data in serialized form; and
      C. if a change to the corresponding portion of the base set of data was included in the one or more changes to the base set of data, adding, to the second file, data encoding the portion of the modified set of data in serialized form; and
   d. a network connection, wherein the network connection is configured to send data serialized by the first computer to one or more remote sites,
   wherein serializing the modified set of data into the second file further comprises adding a plurality of block size indications to the second file, and
   wherein the first computer is further configured to create a signature for the second file, the signature for the second file comprising a plurality of sub-signatures, the plurality of sub-signatures comprising, for each of the plurality of block size indications, a sub-signature identifying a portion of the second file having a size corresponding to the block size indication.

9. The machine of claim 8 wherein the first computer is configured to perform a second serialization process comprising:
   a. adding a serialized version of the base set of data to the second file, wherein the serialized version of the base set of data added to the second file is identical to the serialized form in which the base set of data is stored in the first file; and
   b. adding a set of change information to the second file, the set of change information reflecting the one or more changes to the base set of data.

10. The machine of claim 9, wherein the second serialization process comprises adding, to the second file, a signature corresponding to the first file.

11. The machine of claim 10, comprising a second computer located remotely from the first computer, wherein the second computer is configured to deserialize the modified set of data from a replicated copy of the second file, wherein deserializing the modified set of data from the replicated copy of the second file comprises making the one or more changes indicated in the set of change information from the replicated copy of the second file.

12. The machine of claim 11, wherein the first computer is configured to, based on a determination that the serialized version of the base set of data is available at the second computer, send the set of change information to the second computer.

13. The machine of claim 12, wherein at least one computer taken from the set consisting of the first computer and the second computer is configured to determine that the serialized version of the base set of data is available at the second computer by determining that a file into which data derived from the base set of data was serialized is available at the second computer.

14. The machine of claim 12, wherein at least one computer taken from the set consisting of the first computer and the second computer is configured to determine that the serialized version of the base set of data is available at the second computer by determining that there exists an ancestor set of data from which both the base set of data and a set of data serialized into a file at the second computer were derived.

15. A non-transitory computer readable medium having stored thereon data to configure a computer to perform a set of tasks comprising:
   a. storing, in a database communicatively connected to a first computer, a first file, the first file storing a base set of data in serialized form;
   b. at the first computer, making one or more changes to the base set of data; and
   c. serializing a modified set of data into a second file, wherein the modified set of data is a set of data obtained from the base set of data based on the one or more changes, wherein serializing the modified set of data comprises performing a first serialization process comprising, for each of a plurality of portions of the modified set of data:
      A. determining if a change to a corresponding portion of the base set of data was included in the one or more changes to the base set of data, wherein the corresponding portion of the base set of data corresponds to the portion of the modified set of data;
      B. if no change to the corresponding portion of the base set of data was included in the one or more changes to the base set of data, adding, to the second file, data identical to a portion of the first file encoding the corresponding portion of the base set of data in serialized form; and
      C. if a change to the corresponding portion of the base set of data was included in the one or more changes to the base set of data, adding, to the second file, data encoding the portion of the modified set of data in serialized form,
   wherein serializing the modified set of data further comprises adding, to the second file, a plurality of block size indications to the second file, and
   wherein the method further comprises creating a signature for the second file, the signature for the second file comprising a plurality of sub-signatures, the plurality of sub-signatures comprising, for each of the plurality of block size indications, a sub-signature identifying a portion of the second file having a size corresponding to the block size indication.

* * * * *